United States Patent [19]

Aihara

[11] Patent Number: 5,063,740
[45] Date of Patent: Nov. 12, 1991

[54] ELECTROHYDRAULIC SERVODEVICE FOR POSITION CONTROL

[75] Inventor: Takeshi Aihara, Tama, Japan

[73] Assignee: Nireco Corporation, Tokyo, Japan

[21] Appl. No.: 406,495

[22] Filed: Sep. 13, 1989

[30] Foreign Application Priority Data

Feb. 22, 1989 [JP] Japan ................................. 1-42513

[51] Int. Cl.⁵ .............................................. F15B 9/03
[52] U.S. Cl. ...................................... 60/432; 60/475; 60/476
[58] Field of Search ................. 60/431, 432, 473, 476, 60/911, 475; 91/361, 363 R; 318/561, 615, 618, 619

[56] References Cited

U.S. PATENT DOCUMENTS

| | | | |
|---|---|---|---|
| 2,276,591 | 3/1942 | Ray | 60/432 |
| 2,814,183 | 11/1957 | Holzbock | 91/363 R X |
| 3,374,625 | 3/1968 | Stuart | 60/476 |
| 3,570,243 | 3/1971 | Comer et al. | 91/361 X |
| 3,798,525 | 3/1974 | Cooper | 91/361 X |
| 4,041,704 | 8/1977 | Gygli | 60/476 X |
| 4,404,626 | 9/1983 | Aoyama | 318/615 X |
| 4,535,277 | 8/1985 | Kurakake | 318/615 X |
| 4,816,734 | 3/1989 | Kurakake et al. | 364/174 X |
| 4,912,386 | 3/1990 | Lurie | 318/615 |

FOREIGN PATENT DOCUMENTS 206802 9/1986 Japan .
590495 2/1978 U.S.S.R. .................. 60/431

OTHER PUBLICATIONS

Hyoron-sha, "Immediate Useful Functions and the Best Use of Sensor", Jul. 15, 1982, Japan.
Nireco News, "On-Off Actuator", No. 1, Jul. 1970.
"Electric-Hydraulic Edge-A-Liner Manual", Yasukawa Electric Manufacturer, Feb. 3, 1970, Japan.
OHM-sha, "Reader for Utilizing the Latest Power-Device", Nov. 30, 1987, Japan.

Primary Examiner—John T. Kwon
Assistant Examiner—George Kapsalas
Attorney, Agent, or Firm—Lowe, Price, LeBlanc & Becker

[57] ABSTRACT

The position of a controlled system is regulated with a hydraulic actuator, which is directly linked to a hydraulic pump. The pump is driven in either direction by an electric motor, which is controlled by the output of rotatory direction and driving power generated from a controller based on a desired position and the feedback input of the actual position of the controlled system and the rotatory speed of the electric motor. The controller further includes a gain-variable amplifier for amplifying a deviation of the controlled value from a desired value with a gain characteristic curve of a shape appropriate to the controlled system, attaining a stable and well follow-up control of position.

9 Claims, 8 Drawing Sheets

ELECTROHYDRAULIC SERVODEVICE FOR POSITION CONTROL

BACKGROUND OF THE INVENTION

1. Field of the Invention

This invention relates to an electrohydraulic servodevice for position control with an actuator employing oil hydraulic pump driven by an electric motor rotatable in both directions.

2. Description of the Prior Art

Many methods have been devised to regulate position with oil hydraulic cylinders. FIG. 7 illustrates a control device for truing up the edge of web at a desired position in winding a web around the reel. The displacement of the edge of web 100 detected by the photohead 101 is amplified by the amplifier 102 to magnetize the moving coil 103. In response to the direction and strength of magnetization, the moving coil 103 is attracted to or repelled from the permanent magnet 104 placed inside the moving coil to reciprocate the spool 106 in the servovalve 105 for the valve operation. The pressurized oil from the hydraulic pump is directed by the servovalve 105 to work the hydraulic cylinder 107 for control of the displacement of the web 100 so as to set its edge at the specified position. The hydraulic pump is driven by the motor to supply constantly the servovalve 105 with pressurized oil.

FIG. 8 displays a device for opening or closing the valve 109 by the hydraulic cylinder 107, in which the piston reciprocates between the two positions to operate the valve 109. The control relay 108 is installed to prevent the excess action of the valve in opening and closing. The control signal rotates the motor 111 in either direction for driving the hydraulic pump 110. This method for change of rotatory direction can replace the alteration of flow direction of pressurized oil by the servovalve 105 as demonstrated in FIG. 7. Moreover, the pump 110 is driven only at the running stage of the valve 109.

FIG. 9 shows a driving device for reciprocating the hydraulic cylinder 107 with the axial plunger pump 112 which regulates the flow direction and speed of pressurized oil by adjusting the angle of the swash plate 114 with the DC motor 113 of small inertia. The device also includes the pressure-oil tank 115. A servovalve is unnecessary too in this device, which instead needs to furnish an additional power supply for the plunger pump. The power for the pump is low at the stationary stage, and becomes high only at the running stage of the cylinder.

In the Japanese Patent Application Provisional Publication No. 61-206802, a method is described which regulates with microcomputer the rotatory direction of electric motor for driving the hydraulic pump on the basis of the detected position of the piston in the hydraulic cylinder. Neither employs this device a servovalve and the motor has only to run at the stage of cylinder operation.

The device with the servovalve 105 as shown in FIG. 7 turns out energy loss, rise of oil temperature and wear of the parts, because the servovalve is requisite and the hydraulic pump must always run for supply of pressurized oil.

The device in FIG. 8, which overcomes the disadvantages of the device in FIG. 7, alternates the rotatory direction in response to the signal through relays, causing the strong impact on the device at the change of direction due to disuse of speed control element. The frequent maintenance also is required for the contact relays of switching.

The method in FIG. 9 for control of the rotatory direction and the speed of pressurized oil by the change in angle of the swash plate in the axial plunger pump leads to good performance; however, it is economically unfavorable because the DC motor 113 and the axial plunger pump 112 are expensive.

The device described in the Japanese Patent Application Provisional Publication No. 61-206802 has difficulty in accurate control of the position. The rotatory direction, speed and stationary stage of the electric motor are controlled by detection of displacement and speed of the piston in the hydraulic cylinder, where the speed has to be derived with differentiation of the displacement. It thus becomes probable in this method that the speed derived is not accurate enough for the control because play and inertia in the linking result in the delay between the displacement detected by the displacement detector and the rotatory speed of the electric motor.

In any method for direction control of hydraulic pump employed in FIGS. 8 and 9 and the Japanese Patent Application Provisional Publication No. 61-206802, the time delay in the starting of the cylinder by increase in the oil pressure is inevitable due to the inertia in electric motor and hydraulic pump and the compressibility of oil, when a small variation in the control signal (deviation of a measured value from a desired value) from zero point, at which the pump is in stationary stage, turns the motor to start the pump. This time delay causes the delay in control as well as the tendency in instability. For such a small deviation around zero point, therefore, the output higher than a certain level is desirable to be given to the control circuit of the pump-driving motor.

On the other hand, a large flow rate in the hydraulic circuit in response to a large deviation yields large pressure loss due to the tube resistance to decrease the oil pressure imposed on the piston in the cylinder. The gain has to be set high for quick response and large driving force against large deviations, leading in turn to instability for small deviations. In fact, a small flow rate in response to a small deviation leads to small pressure loss in the tube to impose high oil pressure on the piston, resulting in the large loop-gain for the total system. Elimination of this deficiency is achieved in a device with servovalve as shown in FIG. 7, in which the servovalve has a nonlinear property to adjust the loop gain.

In general, the controller performs effectively with small gain for small load, which makes the loop gain large, and with large gain for large load, respectively. A few special types of controllers recently become commercially available. A PID controller can change the PID parameter according to the value of input signal. Some controllers are capable of automatic alteration of parameter such as automatic selection of the parameter separately against variation by the disturbance and against change in the set point, and automatic tuning of the parameter using AI (artificial intelligence). The effective control can be attained for the electrohydraulic servodevice with such a controller. These controllers, however, are complex and expensive.

SUMMARY OF THE INVENTION

It is accordingly an object of this invention to provide an electrohydraulic servodevice for position control of a controlled system with an actuator operated directly by oil hydraulic pump which an electric motor rotatable in both directions drives in either direction of rotation.

This invention has as another object the provision of a means for accurate position control of a controlled system.

It is still another object of the invention to provide a stable and well follow-up control means without complex and expensive elements attached.

This invention accomplishes the objects in coordination of the hydraulic actuator for position control of the controlled system, the hydraulic pump for direct drive of the actuator, the electric motor to rotate the pump in both directions, and the control means to generate the output of rotatory direction and driving power for the electric motor in response to the feedback input of the deviation of controlled position from a desired position and the rotatory speed of the motor. The control means further includes the gain-variable amplifier to amplify the deviation of the controlled value from the desired value based on the gain characteristic curve of appropriate shape.

DETAILED DESCRIPTION OF THE PREFERRED EMBODIMENTS

Some preferred embodiments of the invention will be described hereinunder with reference to the accompanying drawings.

Figure 1:
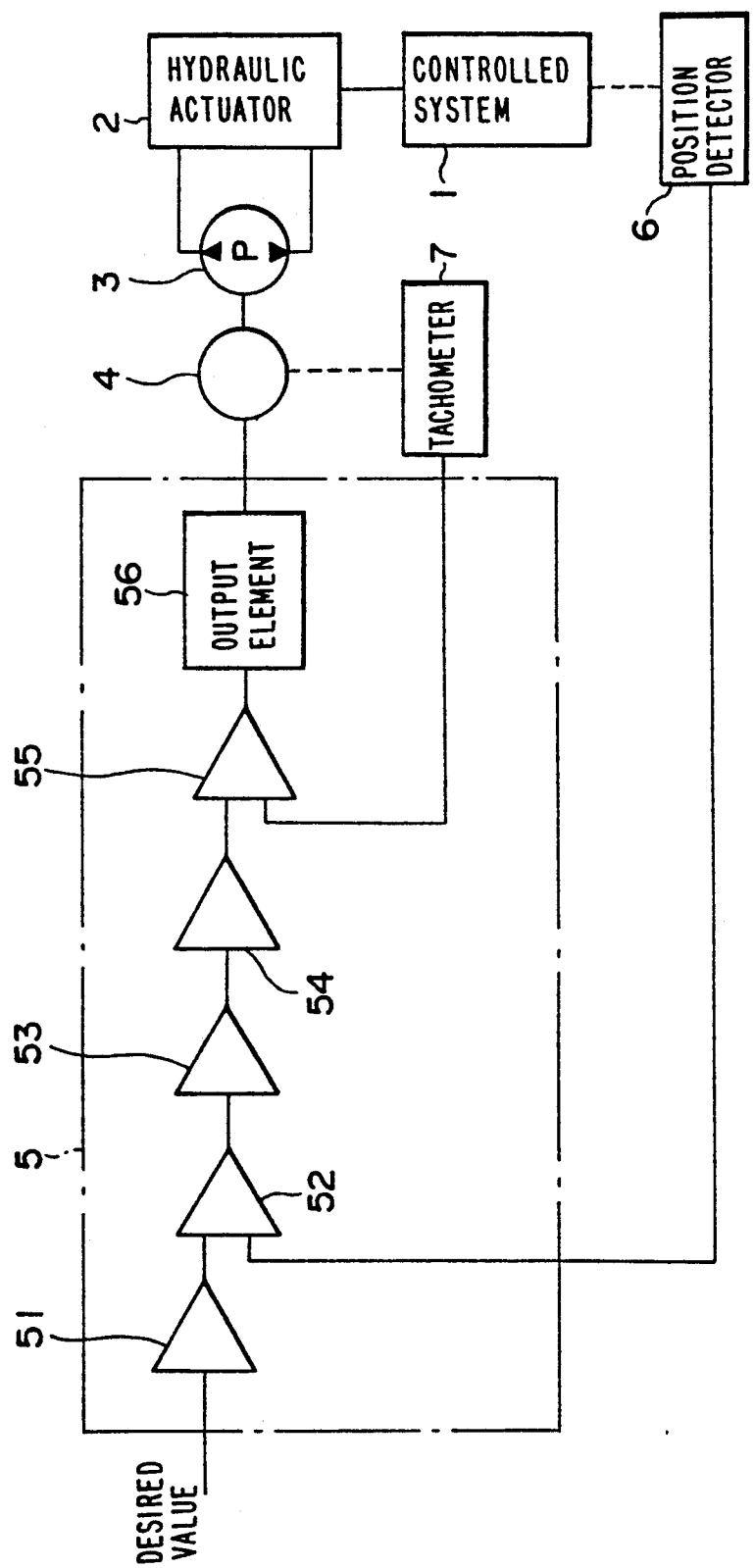
FIG. 1 is a block diagram showing the first embodiment of an electrohydraulic servodevice in accordance with the present invention.

FIG. 1 illustrates the first embodiment in accordance with the present invention. In reference to FIG. 1 the controlled system 1 is controlled with the hydraulic actuator 2 so as for the position of the system to take a desired value. The hydraulic pump 3 is directly linked to the actuator 2 without direction control valve, so that the pump alternates the direction of rotation to change the flow direction of pressurized oil. The electric motor 4 rotatable in both directions drives directly the hydraulic pump 3. The motor 4 is regulated by the controller 5, which in reference to a desired value specified generates the output of rotatory direction and driving power for the electric motor 4 in response to the feedback values of the position of the controlled system detected by the position detector 6 and the rotatory speed of the electric motor 4 measured by the tachometer 7.

The manner of operation of the above described apparatus will be explained in the following.

In the controller 5 a desired value for position control is specified and amplified by the input amplifier 51, the output value of which is compared by the position differential amplifier 52 with the actual position of the controlled system 1 detected by the position detector 6. The deviation therefrom is amplified by the gain-variable voltage amplifier 53, the deviation signal from which is amplified by the current amplifier 54 and fed to the speed differential amplifier 55 to obtain the deviation of the rotatory speed of the electric motor 4 detected by the tachometer 7. The speed deviation is applied to decelerate the motor 4 because the approach to the desired value based solely on the position deviation leads to an excess movement from the desired position due to the moment of inertia of controlled system 1, actuator 2, hydraulic pump 3 and electric motor 4. The speed deviation decreases the excess movement to attain the accurate position control.

Figure 10:
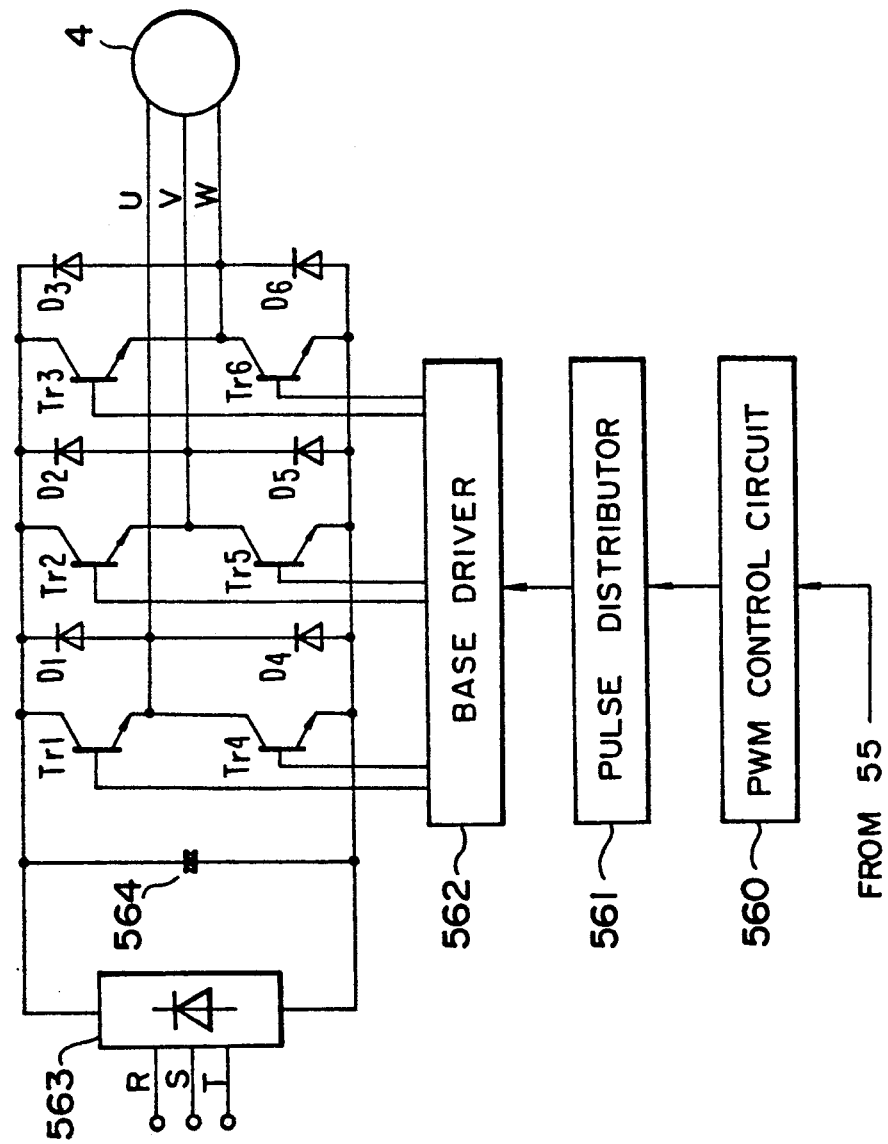
FIG. 10 is a circuit diagram for a conventional output element.

The output element 56 feeds the rotatory direction and driving power to the electric motor 4. The output element is a circuit of the prior art as shown in FIG. 10, in which the PWM (pulse width modulation) control circuit 560 generates the output signal based on the input signal from the speed differential amplifier 55. The distributor 561 distributes the PWM signal into the control signals to every bases of the power transistors $T_{r1} \sim T_{r6}$ described below. The base driver 562 receives these control signals to turn out the drive signal for driving the bases of the power transistors $T_{r1} \sim T_{r6}$. The AC power supply R, S and T is transformed to DC by the rectifier 563, which is smoothed with the condenser 564. The power transistors $T_{r1} \sim T_{r6}$ are parallelly connected to the diodes $D_1 \sim D_6$, respectively. The direct currents flowing into the power transistors $T_{r1} \sim T_6$ are switched according to the drive signals to each base of the power transistors, generating the triphase current U, V and W to drive the electric motor 4.

Figure 4:
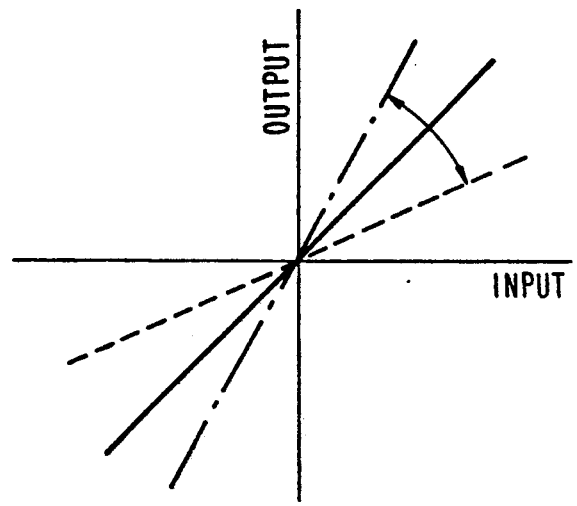
FIG. 4 displays the gain characteristic curves for gain-variable amplifiers.
Figure 5:
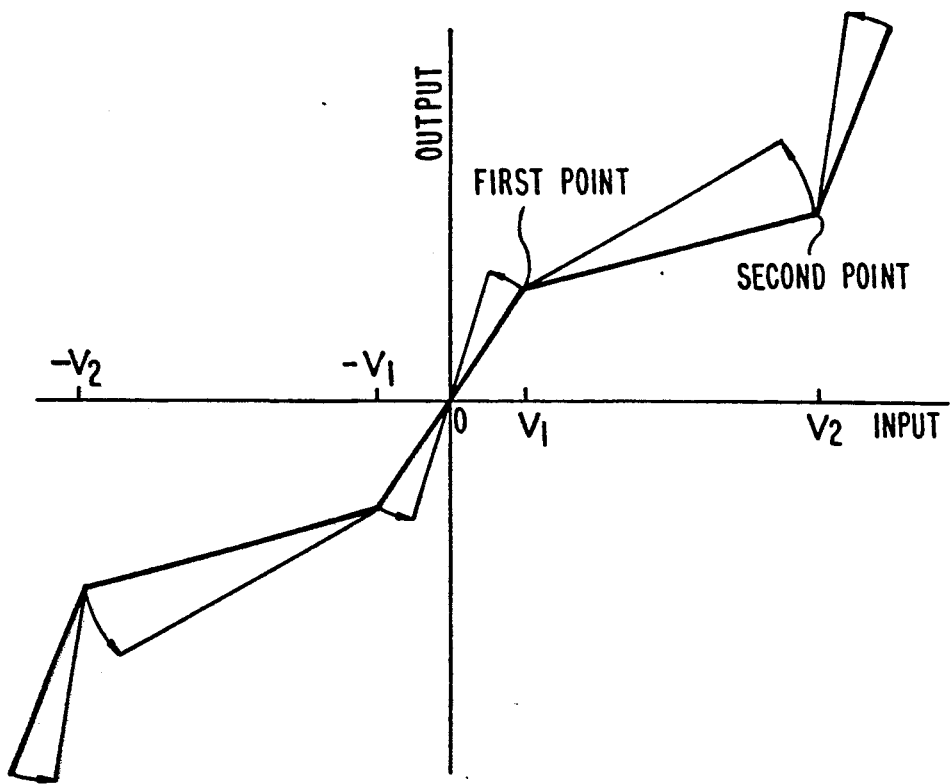
FIG. 5 demonstrates a gain characteristic curve for amplifier represented by several line-segments.

A method of amplification as given in FIG. 4 is applicable to the gain-variable voltage amplifier 53, where the output is proportional to the deviation input and the proportional constant is variable. The control characteristics as demonstrated in FIG. 5, however, lead to better performance for the present embodiment in which the hydraulic pump 3 rotates in both directions to drive directly the actuator 2. In FIG. 5 the relationship of the output with the deviation input is represented with several line-segments; that is, a deviation input around zero between $-V_1$ and $+V_1$ yields a large gain to assure the responsiveness to small deviation, while for a deviation input between $V_1$ and $V_2$ (or, $-V_1$ and $-V_2$) the gain is set small to achieve the stable control. A large gain is again necessary for a deviation input more than $V_2$ or less than $-V_2$ because of quick response required. The gradients for these gains can be predetermined at the zero point, the first points (points at $V_1$ and $-V_1$) and the second points ($V_2$ and $-V_2$), respectively, to suit to the controlled system 1 in a shape like fan as shown in FIG. 5. Installation of amplifier with the characteristics of several line-segments eliminates the above mentioned deficiencies resulting from the direct linking of electric motor 4, hydraulic pump 3 and actuator 2.

Figure 2:
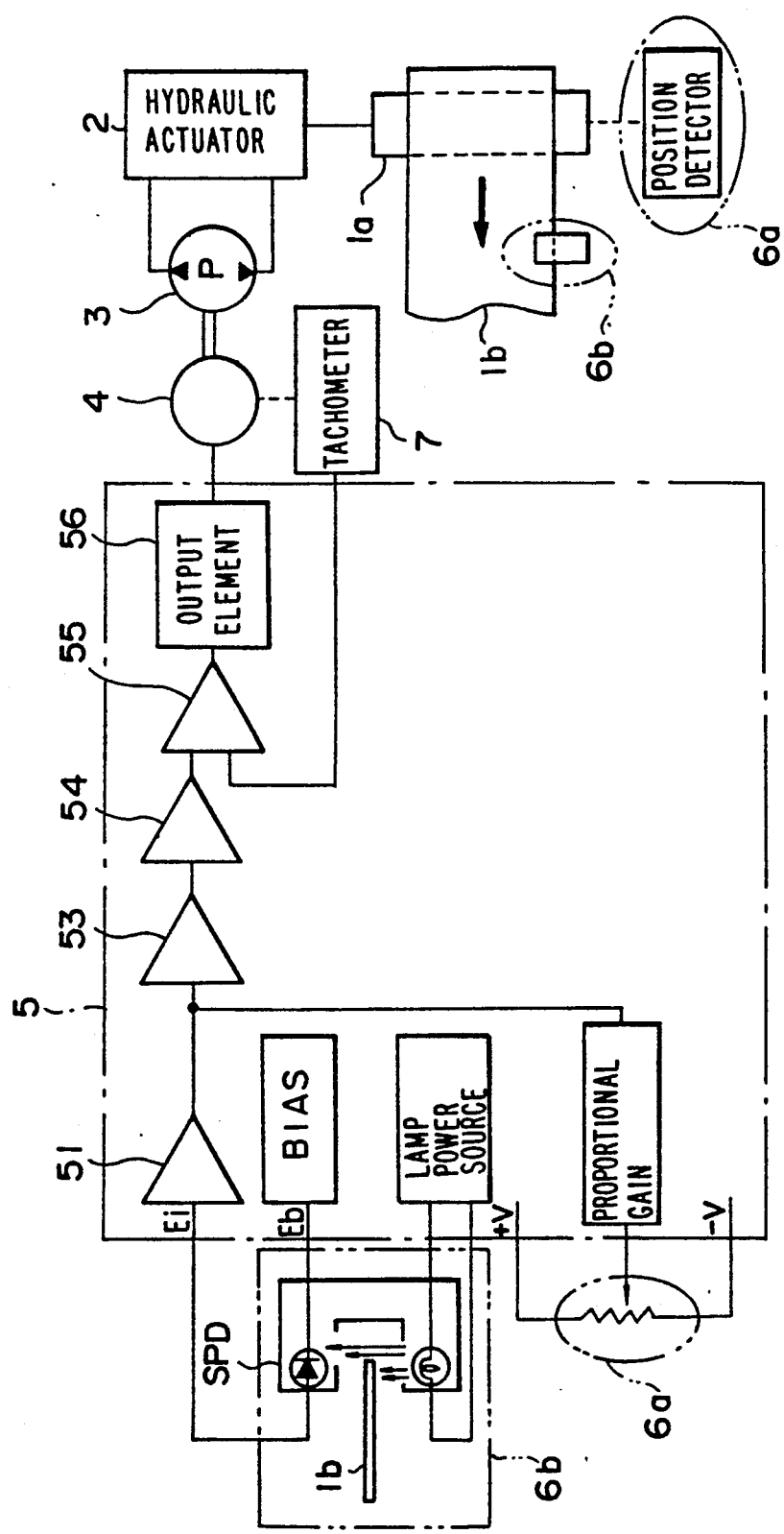
FIG. 2 is a block diagram for the second embodiment of the invention.

Secondly, the second embodiment of the invention will be exemplified with reference to FIG. 2, in which the position of pay off reel wound unevenly with web is regulated with the hydraulic actuator 2 to true up the edge of web in unwinding the wound web for succeeding treatment. The actuator 2 moves the pay off reel for indirect control of web edge, real controlled variable, thus differing from the first embodiment. The position of web edge is measured for the integral action of control, while the both positions of web edge and reel driven by the actuator 2 are measured for the proportional action of control.

In FIG. 2 the same symbols used in FIG. 1 indicate the same elements. For unwinding of the web 1b from the pay off reel 1a, the hydraulic actuator 2 regulates the position of the pay off reel 1a, the displacement of which is detected by the position detector 6a to have the null value for the desired position of the reel 1a and positive and negative values for displacement in one direction and in the opposite direction, respectively. The edge displacement detector 6b, in which the lamp and the silicone photodiode (SPD) are arranged to face one another with the edge of web 1b held between them, detects the displacement of the edge of web 1b in the form of voltage change in the output of the SPD which is proportional to the portion of covering the light path. Since $E_s$, voltage generated by the SPD, always has a positive value, the output of the SPD can be $E_i = E_s - E_b$ by adding a bias voltage $E_b$ in the reverse direction to the other terminal, so that the SPD yields the output of positive or negative value around zero by setting $E_b = \frac{1}{2}E_{smax}$.

The manner of operation of the above described apparatus will be explained in the following.

The displacement of the pay off reel 1a detected by the position detector 6a is amplified with an appropriate proportional gain to add inversely to the amplified value of the output $E_i$ of the edge displacement detector 6b by the input amplifier 51. The sum is fed to the variable voltage amplifier 53 to exert the same action as in the first embodiment. The suitable control can be attained with the displacement of the reel amplified by a proportional gain appropriate to the apparatus, which relates the actual controlled system to the primary control variable, displacement of the web edge. In contrast to the proportional action of control described hereinbefore, the integral action has null proportional gain, that is, no feedback of the detected value of the position detector 6a.

The embodiment is concerned with the control of pay off reel, and similarly applicable for the control of guide roll, which keeps the edge of moving web at a desired position. In the case of guide roll the proportional action of control is employed if the integral action hardly achieves a stable control.

Figure 3:
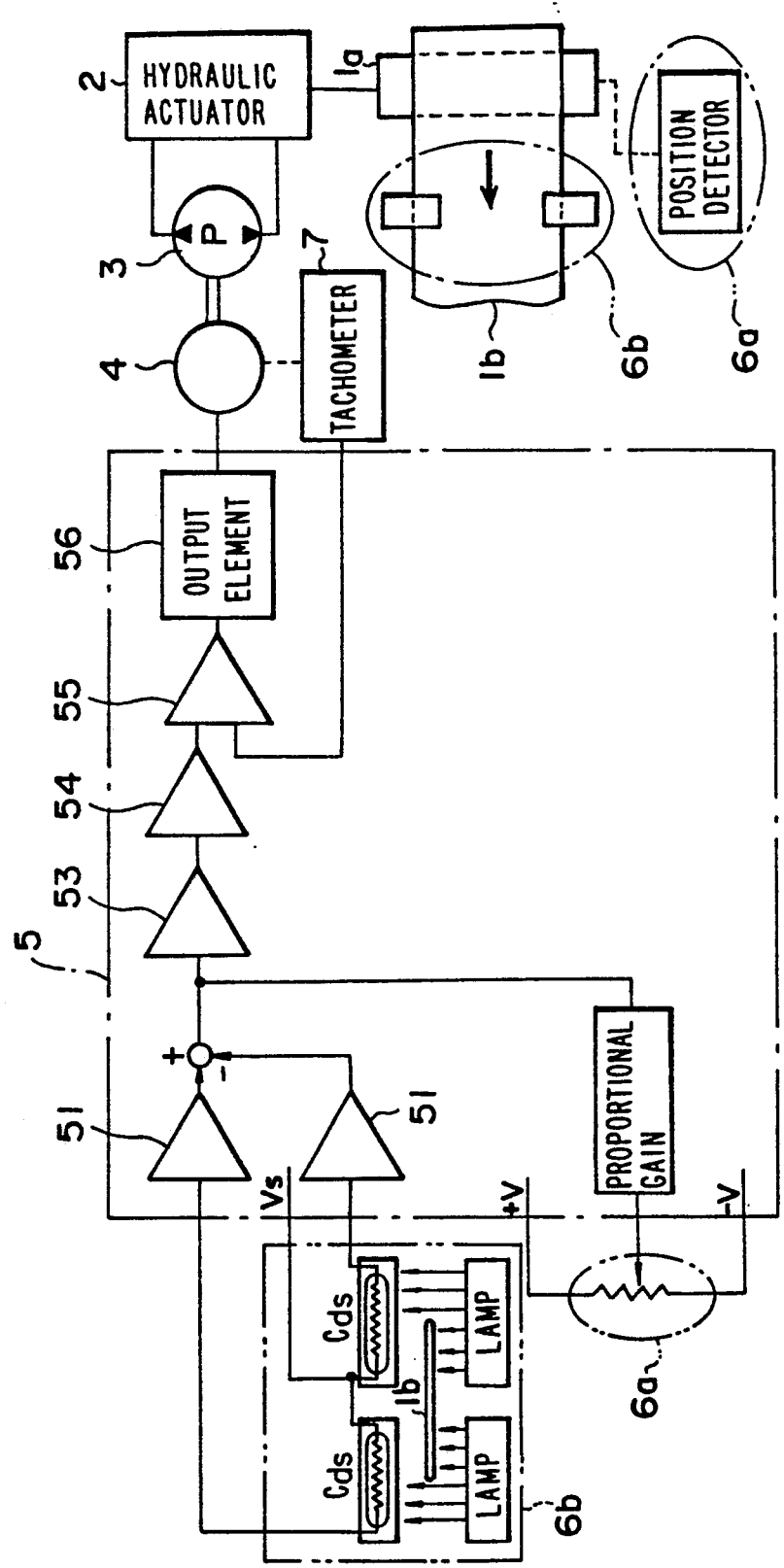
FIG. 3 is a block diagram for the third embodiment of the invention.

FIG. 3 shows the third embodiment of the invention. The controlled system is the same as the second embodiment except that the central position control is realized with the detector 6b for detection of displacement in each edge of web 1b, from which the center of the web 1b is determined by difference in positions of two edges. The same symbols as in FIGS. 1 and 2 indicate the same elements. In the edge displacement detector 6b two lamps are placed on each edge of the web 1b to face the respective photosensors (CdS), the outputs of which are added by the standard voltage $V_s$ and fed to the input amplifier 51. The difference in the outputs is reduced to the deviation of the center of web 1b. The subsequent process is the same as in the second embodiment.

Figure 6:
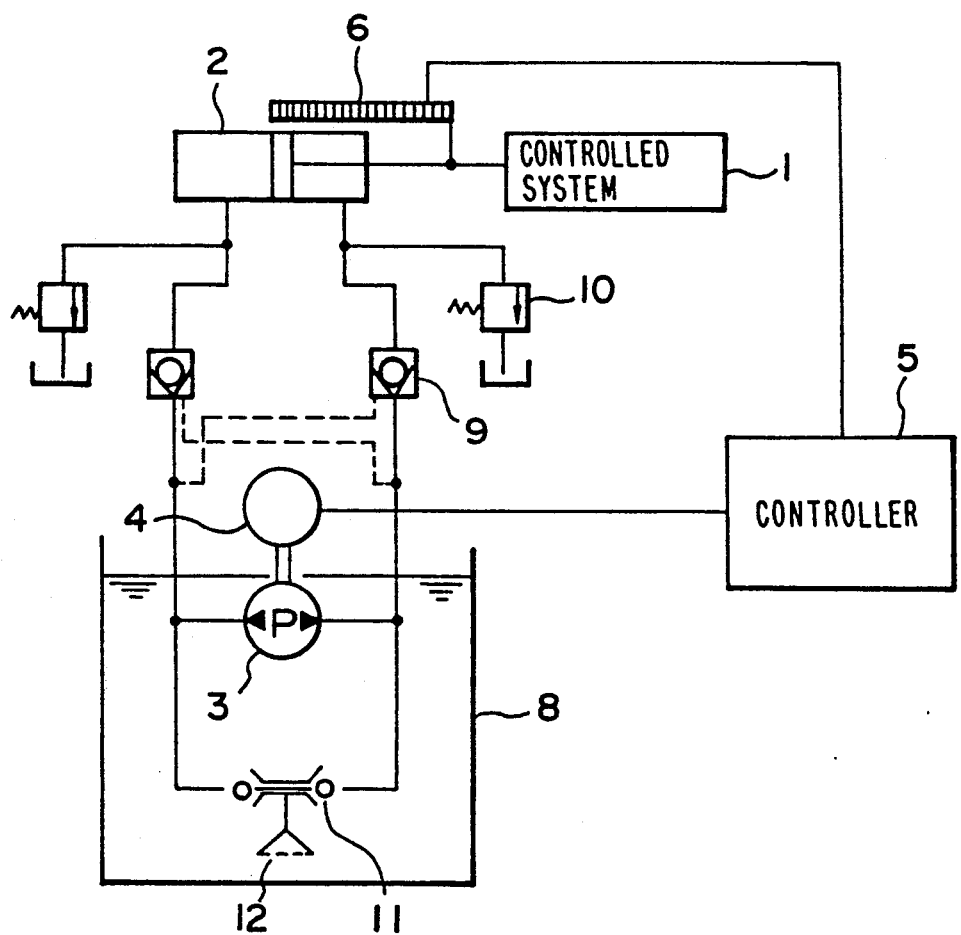
FIG. 6 is a diagram of hydraulic circuit in the fourth embodiment of an electrohydraulic servodevice in accordance with the present invention.
Figure 7:
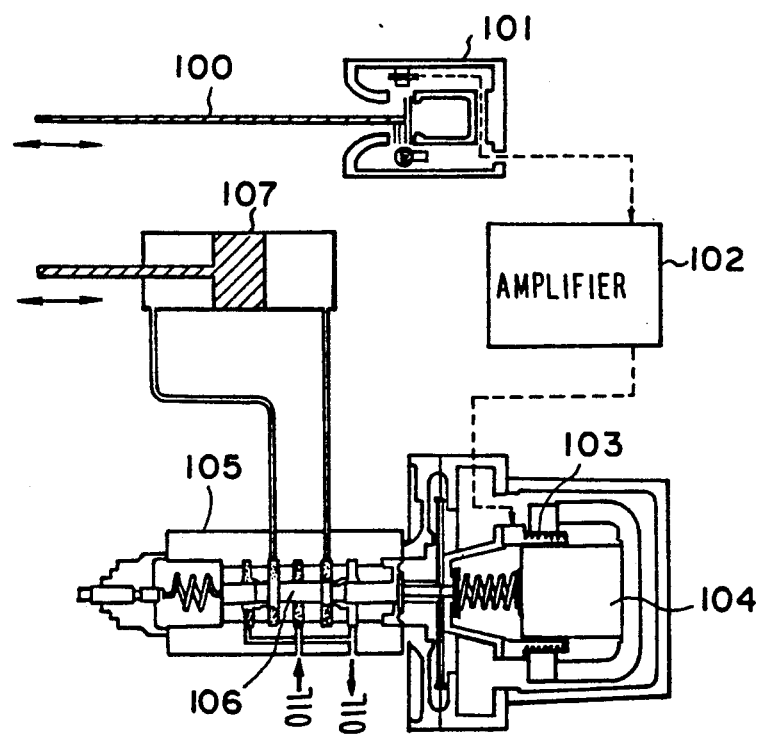
FIG. 7 illustrates a conventional control device for the web edge in the web winding apparatus.

FIG. 6 demonstrates the fourth embodiment of the invention, which includes the same elements of controlled system 1, hydraulic actuator 2, hydraulic pump 3, electric motor 4, controller 5 and position detector 6 as in the first embodiment. The hydraulic pump 3 is installed in the oil inside the oil tank 8. The pilot controlled check valves 9 are placed in the pressure-oil tube and the return-oil tube, respectively, and the oil pressure in the pressure-oil tube controls the check valve 9 in the return-oil tube. The relief valve 10 locates between each of pilot controlled check valves 9 and the hydraulic actuator 2. The shuttle valve 11 and the filter 12 also are placed in the oil tube.

The manner of operation of the above described apparatus will be explained in the following.

The rotation of the electric motor 4 in either direction drives the hydraulic pump 3 in the same direction. In general, the rotatory pump induces the negative pressure in the suction side and the positive pressure in the discharge side, respectively, so that the sealing ability of seal packing becomes dependent on the rotatory direction to cause the air suction and oil leak at the direction change, which can be prevented by installation of the hydraulic pump 3 in the oil inside the oil tank 8.

The pilot controlled check valves 9 are placed in each of two pressure-oil tubes between the hydraulic pump 3 and the hydraulic actuator 2, and the pilot controlled check valve 9 in the return-oil tube is controlled by oil pressure in the pressure-oil tube. The hydraulic actuator 2 thus is able to lock when an imbalanced load is applied to the actuator 2, or the position of the controlled system 1 needs to hold at a fixed site. The relief valve 10 situated at least in either of the two tubes between the check valves 9 and the hydraulic actuator 2 works at large temperature change in the hydraulic circuit for security of the apparatus.

Figure 8:
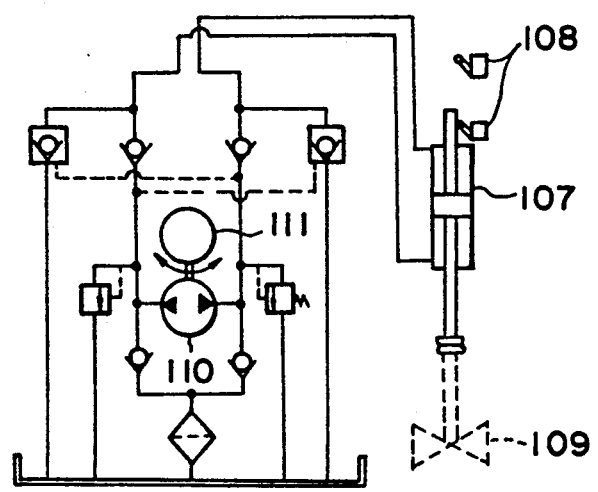
FIG. 8 is a diagram of hydraulic circuit in a conventional hydraulic device for opening and closing of valve.
Figure 9:
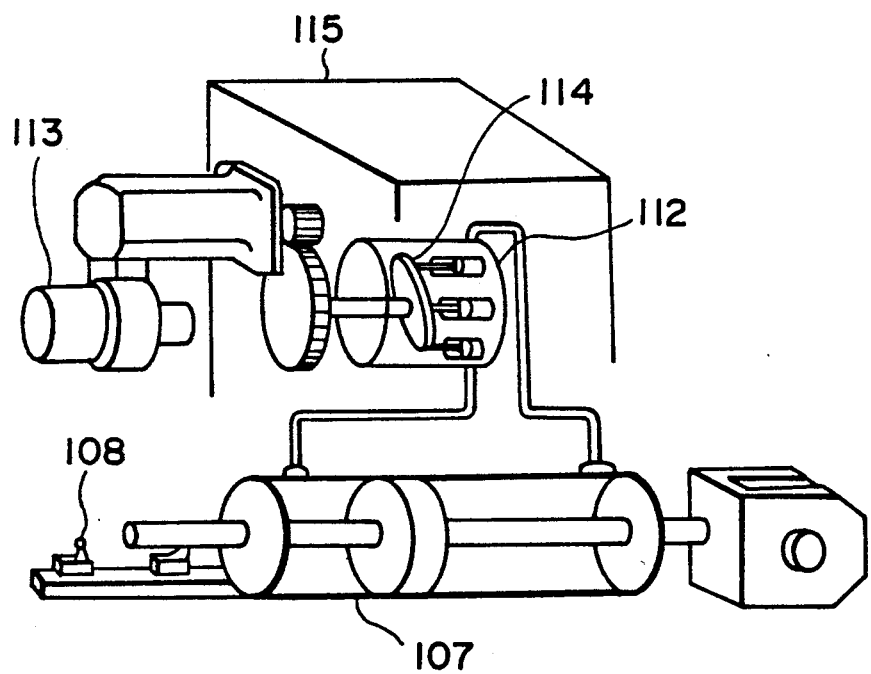
FIG. 9 exhibits a conventional driving device of hydraulic cylinder employing an axial plunger pump.

The amount of oil in the hydraulic circuit varies because the actuator 2 of single rod cylinder changes the oil volume in the cylinder according to the position of the piston and because the oil releases from the relief valves 10 and leaks from the seal packing. The replenishment and release of oil against the variation is performed with the shuttle valve 11 in the oil inside the tank 8. As shown in FIG. 8, two check valves may be installed for a shuttle valve.

Although some obvious changes may be made in the specific embodiment of the invention described herein, such modifications are within the spirit and scope of the invention claimed, implying that all materials contained herein are intended as illustrative and not as limiting in the scope.

What is claimed is:

1. An electrohydraulic servodevice comprising:
   (a) a hydraulic actuator for position control of a controlled system;
   (b) a hydraulic pump rotatable in both directions for driving said hydraulic actuator;
   (c) an electric motor for driving said hydraulic pump in both directions;
   (d) a position detector for detection of the position of said controlled system;
   (e) a tachometer for measurement of the rotatory speed of said electric motor;
   (f) a position-deviation operation element for deriving a deviation of the position detected by said position detector from a desired value;

(g) a gain-variable amplifier for amplifying the output of said position-deviation operation element with a gain characteristic curve of predetermined shape;

(h) a speed-deviation operation element for deriving a deviation of said rotatory speed from the output of said gain-variable amplifier; and (i) an output element for feeding the rotatory direction and driving power to said electric motor based on the output of said speed-deviation operation element.

2. An electrohydraulic servodevice according to claim 1, wherein pilot controlled check valves are placed in each of two oil tubes, one tube for pressure-oil and another tube for return-oil, and the oil pressure in said pressure-oil tube controls the pilot controlled check valve in said return-oil tube.

3. An electrohydraulic servodevice according to claim 2, wherein a relief valve is placed at least in either of said two tubes.

4. An electrohydraulic servodevice according to claim 1, wherein said gain characteristic curve predetermined is represented with some line-segments.

5. An electrohydraulic servodevice comprising:
(a) a reel or guide roll for transfer of a web;
(b) a hydraulic actuator for position control of said reel or guide roll;
(c) a hydraulic pump rotatable in both directions for driving said hydraulic actuator;
(d) an electric motor for driving said hydraulic pump in both directions;
(e) an edge-displacement detector for detection of the edge displacement of said web;

(f) a reel displacement detector for detection of the displacement of said reel or guide roll;

(g) a tachometer for measurement of the rotatory speed of said electric motor;

(h) a gain-variable displacement amplifier for amplifying the displacement of said reel or guide roll with a predetermined gain;

(i) a gain-variable combination amplifier for amplifying a combined value of the outputs of said gain-variable displacement amplifier and said edge-displacement detector with a gain characteristic curve of predetermined shape;

(j) a deviation operation element for deriving a deviation of the output of said gain-variable combination amplifier from the output of said tachometer; and (k) an output element for feeding the rotatory direction and driving power to said electric motor based on the output of said deviation operation element.

6. An electrohydraulic servodevice according to claim 5, wherein said gain characteristic curve predetermined is represented with some line-segments.

7. An electrohydraulic servodevice according to claim 5, wherein said hydraulic pump is installed inside an oil tank for the hydraulic pump.

8. An electrohydraulic servodevice according to claim 5, wherein pilot controlled check valves are placed in each of two oil tubes, one for pressure-oil tube and another for return-oil tube, and the oil pressure in said pressure-oil tube controls the pilot controlled check valve in said return-oil tube.

9. An electrohydraulic servodevice according to claim 8, wherein a relief valve is installed at least in either of said two tubes.

* * * * *